(12) United States Patent
Misiewicz et al.

(10) Patent No.: US 12,079,185 B2
(45) Date of Patent: Sep. 3, 2024

(54) VECTOR-BASED SEARCH RESULT GENERATION

(71) Applicant: Yext, Inc., New York, NY (US)

(72) Inventors: Michael Misiewicz, Brooklyn, NY (US); Michael Dunn, Arlington, VA (US); Maxwell Davish, Brooklyn, NY (US)

(73) Assignee: Yext, Inc., New York, NY (US)

( * ) Notice: Subject to any disclaimer, the term of this patent is extended or adjusted under 35 U.S.C. 154(b) by 26 days.

(21) Appl. No.: 17/084,201

(22) Filed: Oct. 29, 2020

(65) Prior Publication Data

US 2022/0138170 A1    May 5, 2022

(51) Int. Cl.
| | |
|---|---|
| *G06F 16/22* | (2019.01) |
| *G06F 16/242* | (2019.01) |
| *G06F 16/28* | (2019.01) |
| *G06N 3/045* | (2023.01) |
| *G06N 5/02* | (2023.01) |

(52) U.S. Cl.
CPC ...... *G06F 16/2237* (2019.01); *G06F 16/2438* (2019.01); *G06F 16/287* (2019.01); *G06F 16/288* (2019.01); *G06N 3/045* (2023.01); *G06N 5/02* (2013.01)

(58) Field of Classification Search
CPC .. G06F 16/2237; G06F 16/287; G06F 16/288; G06F 16/2438; G06N 3/0454; G06N 5/02
USPC ........................................................ 707/737
See application file for complete search history.

(56) References Cited

U.S. PATENT DOCUMENTS

| | | | |
|---|---|---|---|
| 9,009,146 B1 | 4/2015 | Opatenko et al. | |
| 10,445,431 B1* | 10/2019 | Lev-Tov | ................. G06N 5/02 |
| 10,839,033 B1* | 11/2020 | Fabbrizio | ................ G06F 16/36 |
| 10,956,790 B1* | 3/2021 | Victoroff | ................ G06F 3/0481 |
| 2003/0028448 A1* | 2/2003 | Joseph | ................ G06Q 30/016 |
| | | | 705/304 |
| 2008/0133508 A1 | 6/2008 | Jiang et al. | |
| 2010/0205198 A1 | 8/2010 | Mishne et al. | |

(Continued)

OTHER PUBLICATIONS

PCT Notification of Transmittal of the International Search Report and the Written Opinion of the International Searching Authority for PCT Application No. PCT/US2021057094, mailed Jan. 31, 2022, 12 pages.

*Primary Examiner* — Giovanna B Colan
(74) *Attorney, Agent, or Firm* — Jeffri A. Kaminski; Venable LLP

(57) ABSTRACT

A system and method to generate search results in response to a search query based on comparisons of embedding vectors. The system and method receive, from an end user system, a search query including a set of keywords associated with the entity. Using a neural network, an embedding vector is identified based on the set of keywords of the search query. The system and method compares the embedding vector associated with the search query to a set of embedding vectors associated with a set of structured data elements relating to the entity. Based on the comparison, a set of matching structured data elements is identified. The system and method generate a search result in response to the search query, wherein the search result includes at least a portion of the set of matching structured data elements. The search result is displayed via an interface of the end user system.

13 Claims, 5 Drawing Sheets

(56) References Cited

U.S. PATENT DOCUMENTS

| | | | |
|---|---|---|---|
| 2012/0016877 | A1 | 1/2012 | Vadrevu et al. |
| 2016/0180838 | A1* | 6/2016 | Parada San Martin ................... G10L 15/16 704/232 |
| 2017/0308531 | A1* | 10/2017 | Ma .................. G06N 5/022 |
| 2017/0308791 | A1* | 10/2017 | Jiao .................. G06N 5/02 |
| 2018/0082183 | A1* | 3/2018 | Hertz ................. G06Q 10/10 |
| 2019/0278812 | A1* | 9/2019 | Otsuka ............... G06F 16/00 |
| 2020/0034493 | A1* | 1/2020 | Kempf ............... G06F 16/2457 |
| 2020/0089768 | A1* | 3/2020 | Kim ................. G06F 40/42 |
| 2020/0110768 | A1* | 4/2020 | Bender .............. G06F 16/3329 |
| 2021/0150155 | A1* | 5/2021 | Kim ................. H04L 51/02 |
| 2021/0182291 | A1* | 6/2021 | Yoldemir ............ G06F 16/3329 |
| 2021/0232613 | A1* | 7/2021 | Raval Contractor .... G06N 5/02 |
| 2021/0342634 | A1* | 11/2021 | Chen ................. G06F 18/232 |
| 2021/0390418 | A1* | 12/2021 | Mass ................. G06N 3/08 |

* cited by examiner

VECTOR-BASED SEARCH RESULT GENERATION

TECHNICAL FIELD

Embodiments of the disclosure are generally related to search term management, and more specifically, are related to vector-based search result generation.

BACKGROUND

Conventionally, an end user may conduct a search for information about a merchant using a third party search engine (e.g., Google™, Bing™, Yahoo!™ Search) or a third-party platform (e.g., Yelp™, YouTube™, etc.). The various search platforms provide the end user with information in response to the input of a search query. However, the information provided in response to the search query is frequently incorrect, inaccurate, or incomplete.

To address this problem, an end user may opt to go directly to a website or application associated with the entity (e.g., a merchant's own website). These merchant-specific first party properties frequently provide an antiquated interface and search capabilities (e.g., a directory-type interface combined with a basic site search that displays a list of links). In addition, these websites often use complicated navigation structures (e.g., aligned with internal organization rather than end user search perspectives) powered by extremely basic search functionality. As a result, an end user is far less likely to go directly to a merchant's own web-based properties to get answers to their questions or obtain information about the merchant.

In addition, may websites provide search features wherein a keyword search is performed to identify search results in a frequently asked questions (FAQ) format. For example, an end user may submit a search query with a set of keywords that are analyzed to produce search results in the form of an FAQ. However, keyword searching based on a search query fails to semantically process the user's query. In conventional systems, if a query term does not contain words that precisely overlap with a stored FAQ, the search engine fails to produce or generate the corresponding FAQ as part of the search results due to the semantic incongruity, even in cases when the search term had the same meaning as the FAQ. Accordingly, keyword-based searches fail to provision the optimal FAQ in response to a search query despite the FAQ and search query sharing a matching meaning or context.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
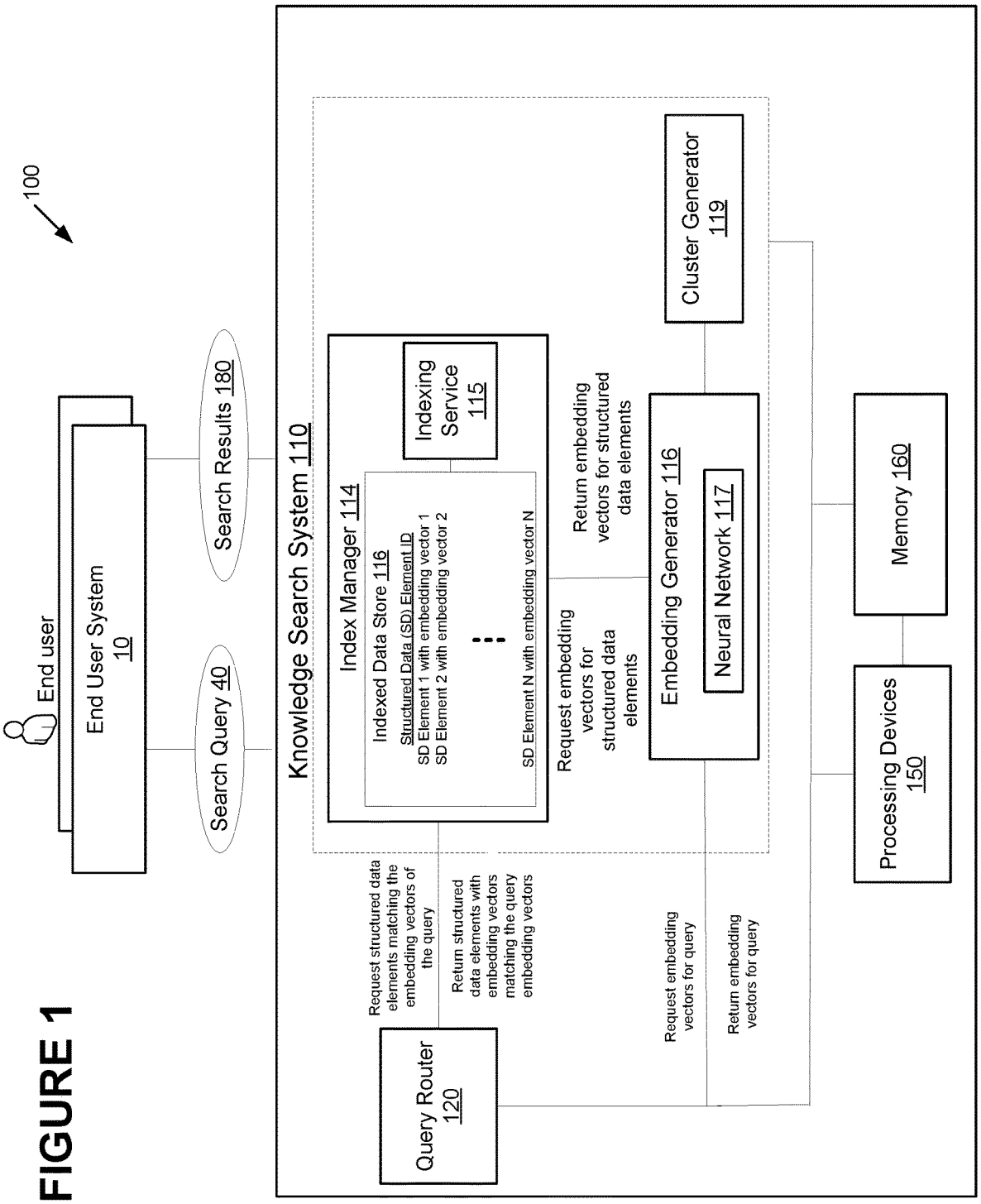
FIG. 1 illustrates an example of a computing environment including a knowledge search system to process search queries and generate search results, in accordance with one or more aspects of the disclosure.

Aspects of the present disclosure relate to generating vector representations of search result candidates and search query terms and producing search results based on a comparison of the vector representations. Embodiments of the disclosure address the above-mentioned problems and other deficiencies with current search engine technologies by providing a knowledge search system to manage a data structure (also referred to as a "knowledge graph" or an "entity knowledge graph") including elements of structured data associated with an entity. The data structure is analyzed by a vector generation process to generate a vector representation for each of the elements of structured data.

In an embodiment, the knowledge search system executes the vector generation process to generate an embedding vector for structure data elements stored in the data structure (e.g., the knowledge graph associated with the entity). In an embodiment, the embedding vector is a unique numerical representation of the structured data element. The knowledge search system receives a search query associated with the entity from an end user. A set of search terms of the search query is identified and processed to generate embedding vectors for each search term (e.g., a unique numerical representation of each search term). The embedding vectors for the search terms are analyzed by a neural network of the vector-based knowledge search system to identify matching or corresponding embedding vectors associated with the structured data elements. Based on the vector comparisons, the knowledge search system generates a search result to provision to the end user system that submitted the search query.

The knowledge search system employs the vector generation and comparison process to rank candidate search results within a vertical or search result category (e.g., ranking candidate FAQs within an FAQ vertical). Advantageously, each respective search result candidate within a vertical (e.g., also referred to as a "vertical category") can be assigned a score or ranking based on the corresponding comparison of the embedding vectors associated with the candidate search result and the search terms of the search query. The knowledge search system can generate a user interface including the search results wherein the presentation of the user interface is configured in accordance with the respective scores or rankings of the candidate search results within a particular vertical category.

In an embodiment, the knowledge search system can provide a universal or "home" search page that provisions search results including data from multiple different vertical sources to generate an aggregated search results page or interface. Advantageously, the knowledge search system includes a knowledge search engine platform to process end-user search queries to provide search results from information stored by the system along with a set of third party data publishers (e.g., data sources such as Google™, Facebook™, Bing™, Apple™, and other search service providers). The knowledge search engine platform provides an integrated search engine configured to generate search results based on multiple data sets (e.g., multiple verticals) from multiple search provider sources (e.g., multiple vertical sources) including a native data set (e.g., data maintained by the entity system) and third-party data sets (e.g., data acquired from one or more third party search providers).

In an embodiment, the knowledge search system employs the vector generation and comparison process to rank set of multiple vertical sources (e.g., generate an interface wherein a first location of the interface is assigned to a first vertical source based on the vector-based comparison, a second location of the interface is assigned to a second vertical source based on the vector-based comparison, and so on) or search result category (e.g., ranking candidate FAQs within an FAQ vertical). in addition to the universal search page, there are individual vertical source search pages. In an embodiment, the universal search page and the one or more vertical search pages can inherit global branding associated with the merchant.

According to embodiments, a set of candidate search results (e.g., FAQs) of structured data elements are ranked and scored based on the embedding vector comparisons and analysis. Advantageously, an improved ranking of structured data elements within a vertical (e.g., a rank of multiple FAQs) is identified and used to provision the search results to an end user in accordance with the ranking, in response to the search query. In addition, the knowledge search system can rank or score a set of candidate vertical sources based on the embedding vector comparisons and analysis. Accordingly, an improved search result set is generated and provisioned to the end user including multiple layered ranking and scoring (e.g., ranking respective structured data elements in a vertical and ranking vertical sources associated with the structured data elements) as a result of embedding vector processing by a neural network of the knowledge search system.

The component search terms or keywords of the collected search query data are identified and processed by a neural network to generate a corresponding embedding vector. Advantageously, comparing an embedding vector corresponding to each of the respective search terms enables the generation of clusters including sets of component search terms (e.g., search terms that have embedding vectors that satisfy matching criteria).

Embodiments of the disclosure address the above-mentioned problems and other deficiencies with current search engine technologies by providing a knowledge search system to allow end users (e.g., an individual using a search engine to obtain knowledge or information about a merchant, product, or service) to employ one or more knowledge search features (also referred to as "answers") to enable an improved searching experience. Knowledge can be defined as "facts" or data regarding a subject that can be stored in an indexed database that is searchable in response to an end user search query.

Advantageously, the vector-based processing described herein enables the transformation of a search query including unstructured data elements (e.g., a collection of keywords) to identify and produce a search result including a structured data element. This transformation of data and generation of a search result based on a mapping and comparison of an unstructured data input (e.g., the search query) to structured data of the candidate search results provides for an improvement to the transmission, generation and display of data by the knowledge search system.

FIG. 1 illustrates an example computing environment 100 including a knowledge search system 110 communicatively connected to one or more end user systems 10 to receive and process one or more search queries relating to an entity and produce search results 180, according to embodiments of the present disclosure. In one embodiment, the knowledge search system 110 may be integrated or embedded within a system managed and controlled by an entity and executable in response to a search query input received from an end user system. In an embodiment, the knowledge search system 110 may be accessible via an entity system and executed on one or more separate computing devices (e.g., servers). The knowledge search system 110 can include a memory 160 to store instructions associated with the operations, features and functionality described herein and one or more processing devices 150 to execute the instructions.

As used herein, the term "end user" refers to one or more users operating an electronic device (e.g., end user system 10) to submit a search query 40 associated with an entity (e.g., a merchant) for processing by the knowledge search system 110. In an embodiment, the end user may initiate a search by entering an input query via an interface of a webpage associated with the entity or a third party. For example, the end user, using the end user system 10, may be a customer or prospective customer searching for information about the entity. The knowledge search system 110 may be communicatively connected to the end user system 10 via a suitable network.

The knowledge search system 110 is configured to receive the search query 40 and generate a set of search results 180 in response to the search query 40 initiated by the end user system 10. For example, the end user system 10 may be any suitable computing device (e.g., a mobile device, a desktop computer, a laptop computer, etc.) associated with an end user in search of information relating to the entity (e.g., information about a merchant or a related product or service).

According to embodiments, the knowledge search system 110 can include one or more software and/or hardware modules, including a query router 120, an index manager 114, and a vector embedding generator 116, the one or more processing devices 150, and the one or more memory devices 160. In one embodiment, the components or modules of the knowledge search system 110 may be executed on one or more computer platforms of a system associated with an entity that are interconnected by one or more networks, which may include the Internet. The components or modules of the knowledge search system 110 may be, for example, a hardware component, circuitry, dedicated logic, programmable logic, microcode, etc., that may be implemented in the processing device of the knowledge search system.

In an embodiment, the index manager 114 includes an indexing service 115 configured to index multiple structured data elements associated with the entity. The structured data elements (also referred to as "SD elements") represents "knowledge" or facts associated with the entity that are maintained in an indexed data store 116. The indexed data store 116 (also referred to as a "knowledge graph") includes the set of structured data elements associated with the entity.

In an embodiment, the indexing service 115 is operatively coupled to an embedding vector generator 116. In an embodiment, the embedding generator 116 includes a neural network 117 configured to receive requests to generate embedding vectors for the structured data elements stored in the indexed data store 116. In an embodiment, the embedding generator 115 receives the requests from the index service 115 for the generation of embedding vectors for each of the structured data elements in the indexed data store 116 (e.g., each structured data element in the entity's knowledge graph). In an embodiment, the embedding vector is a unique numerical representation of the structured data element. Accordingly, the embedding generator 116 executes the neural network 117 configured to generate a unique embedding vector associated with each respective structured data element of the knowledge graph associated with the entity.

In an embodiment, the neural network 117 is configured to execute a neural network-based process for natural language processing of the structured data elements (e.g., various FAQs associated with the entity) to determine a context of the structured data elements to generate the associated embedding vectors. According to an embodiment, the embedding vectors for each structured data elements can be generated using a neural network or machine learning system configured to employ a library for learning term embeddings and term classifications to create an unsupervised or supervised learning algorithm to generate the vector representations for the search terms. In an embodiment, the neural network 117 can be, for example, a bidirectional encoder representations (BERT) system, a fastText system, a Word2Vec system, a Healthcare Word2Vec system, etc.

In an embodiment, the embedding generator 116 returns the embedding vectors corresponding to the structured data elements to the index manager 114. In an embodiment, the index manager 114 updates the indexed data store 116 to include the corresponding vector information relating to each of the structured data elements. For example, a first structured data element (e.g., FAQ 1) is associated with a first embedding vector value, a second structured data element (e.g., FAQ 2) is associated with a second embedding vector value, and so on.

In an embodiment, the knowledge search system 110 can include a cluster generator 119 configured to compare the vector representation of each structured data element to identify a cluster including a set of structured data elements having similar vector representations (e.g., vector representations that are within a range, tolerance, or threshold in comparison to one another).

In an embodiment, the generation of the embedding vectors for the structured data elements can be performed during an "offline" process executed by the knowledge search system 110. In this regard, the generation of embedding vectors for the structured data elements can occur in advance of subsequent search queries to enable the efficient and timely generation of search results based on the vector information for the candidate structured data elements in response to the search query.

In an embodiment, the query router 120 is configured to receive a search query 40 associated with the entity (e.g., a question about the entity's goods or services) from the end user system 10. The query router 112 is operatively coupled to the embedding generator 116 and the index manager 114. In an embodiment, in response to a search query 40, the query router 120 sends a request to the embedding generator 116 for one or more embedding vectors corresponding to the one or more search terms or keywords of the search query 40. In an embodiment, each of the keyword or search terms of the search query 40 is run through the embedding generator 116 to produce a corresponding embedding vector (e.g., a set of vector corresponding to a set of keywords or search terms).

In an embodiment, the embedding generator 114 returns to the query router 120 the generated embedding vector for each of the keyword or search terms of the search query 40. In an embodiment, in response to receipt of the search term embedding vectors, the query router 120 sends a request to the operatively coupled index manager 114 with the search term embedding vector data. In an embodiment, the query router 120 is requesting that the index manager 114 identify one or more structured data elements that have an embedding vector that matches the embedding vectors of the query. In an embodiment, the query router 120 submits the search to the index manager 114 to identify the previously indexed structured data elements having embedding vector information that matches the embedding vector information of the search query 40.

In an embodiment, the index manager 114 identifies a set of candidate structured data elements based on the vector comparison and analysis. In an embodiment, the index manager 114 can generate a ranking or score associated with each of the candidate structured data elements based on a level of matching between the structured data element embedding vectors when compared to the search query embedding vectors.

In an embodiment, the index manager 114 is operatively connected to multiple different providers of information, referred to as search provider sources or vertical sources (e.g., a first search provider source, a second search provider source, a third search provider source, etc.). One or more of the search provider sources can include information that is managed, maintained, controlled, and provisioned by the knowledge search system 110. In an embodiment, one or more of the search provider sources can include information that is managed maintained, controlled, and provisioned by a third party system. In an embodiment, information from the one or more vertical sources are transformed or converted to structured data elements that are organized in the knowledge graph associated with the entity.

In an example, if the entity is a financial institution website (e.g., a bank website), a first search provider source can include a financial advisor data store (e.g., a source of information relating to financial advisors), a second search provider source can include a bank branch and ATM data store, a third search provider source can include a Frequently Asked Questions (FAQ) data store, and a fourth search provider source can be a third-party provider of information, such as, for example, the Zendesk™ platform, the Swiftype™ platform, etc.

Advantageously, the knowledge search system 110 is configured to continuously generate embedding vectors for structured data elements in a knowledge graph and storing the resulting vectors into the indexed data store 116. In an embodiment, each entity can have a set of configurable fields or structured data element type (e.g., FAQs, descriptions, names, titles, etc.) to be indexed by the index manager 114. In an embodiment, the knowledge search system 110 retrieves the fields from the indexed data store 116 and submits the fields to the embedding generator 116. As described above, the embedding generator 116 responds with the unique vector which is a numerical representation of the structured data element and the indexing service 115 stores the generated vector in the indexed data store 116 for subsequent use in generating search results in response to a search query.

In an embodiment, the knowledge search system 110 responds to end user search queries in real time by matching the end user's query in an embedding feature space with a list of results (e.g., the structured data elements having a corresponding vector value) that are identified as most relevant based on their relative similarity in numerical vector space. The identified "matching" structured data elements are returned to the end user as the search results 180.

In an embodiment, the query router 120 sends the search query 40 to the embedding generator 116 to obtain a corresponding vector value. In an embodiment, the query router 120 queries (or sends a request) to the index manager 114 to identify one or more candidate structured data elements which are close to the query in feature space. In an embodiment, the index manager 114 scores or ranks each of the candidate structured data elements using a distance metric function (e.g., cosine similarity, euclidean distance, manhattan distance, jaccard similarity, etc.). In an embodiment, the index manager 114 applies a distance threshold level to the generated scores and selects the one or more structured data elements for inclusion in the search results 180 if a condition is satisfied (e.g., if the score represents a distance that is less than the distance threshold level). in an embodiment, the query router 120 generates an interface displaying the search results 180 that are identified by the index manager 114. In an embodiment, a location in the interface can be determined based on the scores associated with the respective candidate structured data elements. For example, a first location of the interface (e.g., a top portion of a listing) can be assigned to a first structured data element having a score representing a closest relative distance value as compared to the query embedding vector.

In an embodiment, the knowledge search system 110 can be configured to execute a training procedure to produce an optimal neural network 117, to be used by the embedding generator 116 for both structured data element and query embedding. In an embodiment, the training process includes selecting example training queries from search logs and generating a label for each (e.g., labels such as "relevant", "answer" or "not relevant"). In an embodiment, the label values or categories can be mapped to numerical values. These labeled queries are used to train the neural network 117 to predict relationships between queries and documents. The neural network 117 can include any suitable model, including, for example, BERT, RoBERTa, CamemBERT, GPT or GPT-2.

In an embodiment, the knowledge search system 110 is configured to train the neural network mode using the labeled data to optimally predict a match between a search query and a structured data element. In an embodiment, a refined or trained neural network model can be exported to the embedding generator 116, where output from the neural network model is served both for indexing and query processing, as described in detail above.

Advantageously, the knowledge search system 110 enables enhanced search result generation. In an embodiment, the knowledge search system 110 labels search queries and structured data elements and serves the corresponding search results efficiently as compared to conventional keyword matching system. In particular, certain conventional searching processes require many matches in words between the queries and unstructured documents. As an improvement, the neural network training described above does not require a large number of word matches. Accordingly, the search results generated by the knowledge search system 110 provide for improved query comprehension and enhanced candidate search result recall (e.g., recall with sub-100 ms latencies).

In an embodiment, the knowledge search system 110 can provide a universal or "home" search page that collects search result data from multiple different vertical sources to generate an aggregated search results page or interface for provisioning to the end user system 10. In an embodiment, in addition to the universal search page, there are individual vertical source search pages. In an embodiment, the universal search page and the one or more vertical search pages can inherit global branding associated with the entity.

In an embodiment, the knowledge search system 110 can embed one or more search provider source templates to render search responses. In an embodiment, when a search provider source is embedded in the universal search platform, the universal search platform can use a template system to render the search results. In an embodiment, one or more templates can be generated per search provider source that inherits the global branding associated with the entity system. In an embodiment, a search provider source (e.g., a component of an entity system) can be associated with multiple templates that a merchant user can select during configuration of the search provider source. In an embodiment, a default or standard templates can be configured as a customized template and applied to one or more search provider sources.

In an embodiment, the index manager 114 includes a ranking component configured to execute a ranking or scoring process for the matches between the query and the structured data elements. Advantageously, in an embodiment, the ranking component can generate a first set of rankings associated with the structured data elements within a vertical and a second set of rankings associated with multiple search provider sources (e.g., verticals). Accordingly, each individual search result candidate is assigned a ranking or score. Furthermore, in an embodiment, each search provider source is also assigned a ranking or score. In an embodiment, for a given search query, the ranking component can identify a highest ranking search provider source and then identify the one or more highest ranking structured data elements provided by the identified highest ranking search provider source.

For example, the ranking component can rank ten search provider sources (e.g., ten verticals) based on search provider source criteria (e.g., an overall distance measurement associated with a vertical, a trustworthiness level associated with the vertical, whether the vertical is associated with the entity system, historical user engagement activity levels associated with the vertical, etc.). If, based on the ranking of the verticals, it is determined that vertical seven (of the ten candidate verticals) has a highest relative ranking or score, the ranking component can identify a prioritized location on the interface for displaying the one or more highest ranked structured data elements provided by vertical seven for provisioning to the end user.

In an embodiment, the ranking component can first rank or score each search provider source (i.e., vertical). For example, if the search query is "New York City", a "locations" search provider source can provide a set of search responses including various locations in New York City. In this example, a "jobs" search provider source can provide a set of search responses including various employment opportunities in New York City. In this example, a "FAQ" search provider source can provide a set of search responses including frequently asked questions associated with New York City. Following the return of the different search responses by the different search provider sources, the knowledge search system 110 can combine the different search results together. In an embodiment, the knowledge search system 110 uses the vector-based quality (e.g., ranking or score) of the structured data elements as provided by the index manager 114 to determine an optimal or prioritized order of presentation within the interface of the search provider sources. In an embodiment, the knowledge search system 110 generates a display including the presentation of the search provider sources in an order that is based on the ranking information. In an embodiment, the ranking information can be used to re-order one or more tabs or links associated with the search interface (e.g., tabs associated with the multiple different search provider sources).

In an embodiment, the knowledge search system 110 is configured to receive the candidate structured data elements and ranking information and integrate the multiple responses to generate the search results 180 for return to the end user system (e.g., via a display of a webpage).

In an embodiment, the knowledge search system 110 is configured to apply a set of rules relating to the generation of the search results for provisioning to the end user system 10. In an embodiment, the set of rules are configurable or customizable by an entity. For example, an entity can apply one or more specific rules or logic to adjust the search results associated with the entity. In an embodiment, a default set of rules can indicate that the search results are provisioned based on relevance and verification, as described above, one or more merchant-specific rules can be established for an entity.

In an embodiment, the knowledge search system 110 can enable an entity to establish query rules to augment, modify, or guide the vector-based search result integration process. For example, the knowledge search system 110 can employ or enforce an "if this, then that" query rule framework that enables an entity to adjust, fine-tune, or override results behavior depending on the one or more search query terms and an intent detected.

In an embodiment, the one or more query rules can be used to adjust the order of presentation or listing of the search results within (or provided by) a search provider source (e.g., boost or improve the position of a search result) and bury search results (e.g., decrease or lower the position of a search result). In an embodiment, the one or more query rules can be used to adjust the order of display or listing of the source provider sources (e.g., boost and bury source provider systems in a display of the search results).

An example entity-specific query rule can include, but is not limited to the following: to prevent cancellations, a telecommunication company can establish a query rule indicating that if the user searches for "cancel my account," the knowledge search system 110 first returns a set of results that highlights how a customer can downgrade or pause a subscription, before displaying FAQ relating to how to cancel an account.

Another example entity-specific query rule can include, but is not limited to the following: a financial services firm can establish a query rule configured to boost loan officers in their search results, if it is determined that the end user is in a high value segment.

Yet another example entity-specific query rule can include, but is not limited to the following: a retailer generates a merchant-specific query rule that indicates, if a new user is searching on the site, the results returned display "Products" at the top of the webpage. Other example merchant-specific query rules can include, but are not limited to the following: a bank restricts the results depending on the role of the logged-in user; to reduce strain on their call center, an insurance firm boosts the results for "Live Chat" if a customer searches for "call customer support, etc.

In an embodiment, as noted above, the criteria and action for an entity-specific query rule can include a context associated with a search query. The context can be a custom-defined object (e.g., a JSON object) that can include one or more parameters such as attributes associated with the end user, a role associated with the end user, a segment associated with the end user, or other suitable parameter. In an example of a context-based query rule, if an end user executing a search query via a financial services merchant system is identified as a "high net worth" individual (e.g., the context is identified relating to a net worth attribute of the end user), the knowledge search system 110 can perform a corresponding action pursuant to the query rule (e.g., prioritize information relating to Advisor A in the search results).

In an embodiment, the context can be applied by the knowledge search system 110 at a rule-level to determine if a rule is to be applied. In this embodiment, the knowledge search system 110 can determine if a certain context criteria is satisfied, and if so, apply or not apply one or more certain query rules to the set of candidate structured data elements that were identified and ranked based on the vector-based process described above.

Figure 2:
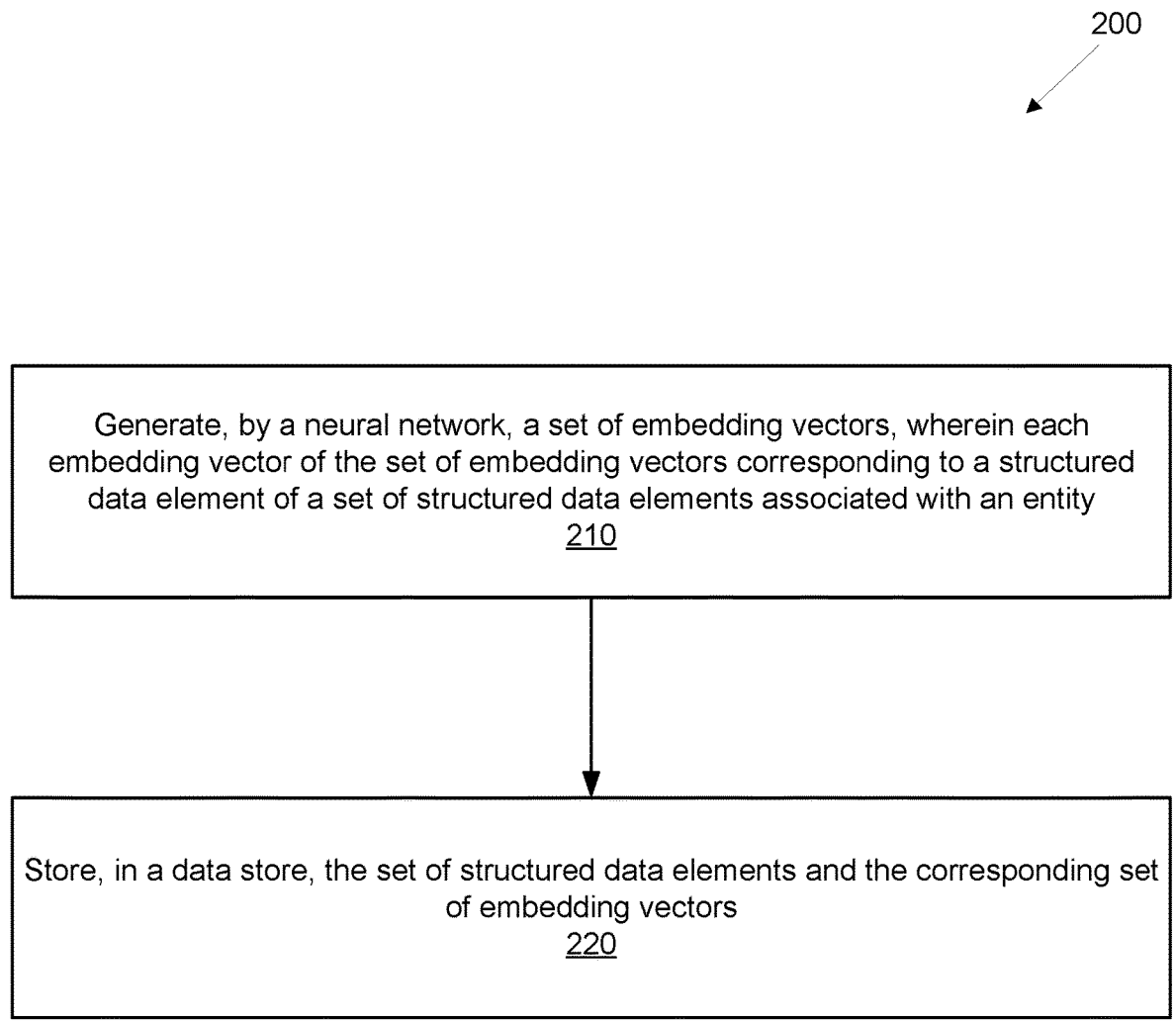
FIG. 2 illustrates a flow of an example method including generating and storing of embedding vectors for structured data elements associated with an entity, in accordance with one or more aspects of the disclosure.

FIG. 2 illustrates a flow diagram relating to an example method 200 including operations performed by a knowledge search system (e.g., knowledge search system 110 of FIG. 1), according to embodiments of the present disclosure. It is understood that the flowchart of FIG. 2 provides an example of the many different types of functional arrangements that may be employed to implement the operation of the notification management component as described herein. Method 200 may be performed by a processing logic that may comprise hardware (e.g., circuitry, dedicated logic, programmable logic, microcode, etc.), software (e.g., instructions run on a processing device), or a combination thereof. In one embodiment, the knowledge search system executes the method 200 to identify embedding vectors for structured data elements associated with an entity for use in the subsequent generation of search results in response to a search query.

In operation 210, the processing logic executes a neural network to generate a set of embedding vectors, wherein each embedding vector of the set of embedding vectors corresponding to a structured data element of a set of structured data elements associated with an entity. In an embodiment, one or more fields associated with the structured data elements relating to the entity are identified. In an embodiment, the one or more fields are identified in view of a selection received from a user associated with the entity.

In an embodiment, the neural network retrieves the one or more fields from a data store including a collection of the structured data elements relating to the entity (e.g., a knowledge graph associated with the entity). In an embodiment, the retrieved fields are submitted to an embedding process executed by the neural network to generate an embedding vector for each of the identified structured data elements. In an embodiment, the embedding vector is a unique vector which is a numerical representation of the corresponding structured data element.

In operation 220, the processing logic identifies, using a neural network, a set of embedding vectors, wherein each of the set of embedding vectors represents a search term of the set of search terms. In an embodiment, the data store includes an indexed collection of the multiple structured data elements and each elements corresponding embedding vector.

Figure 3:
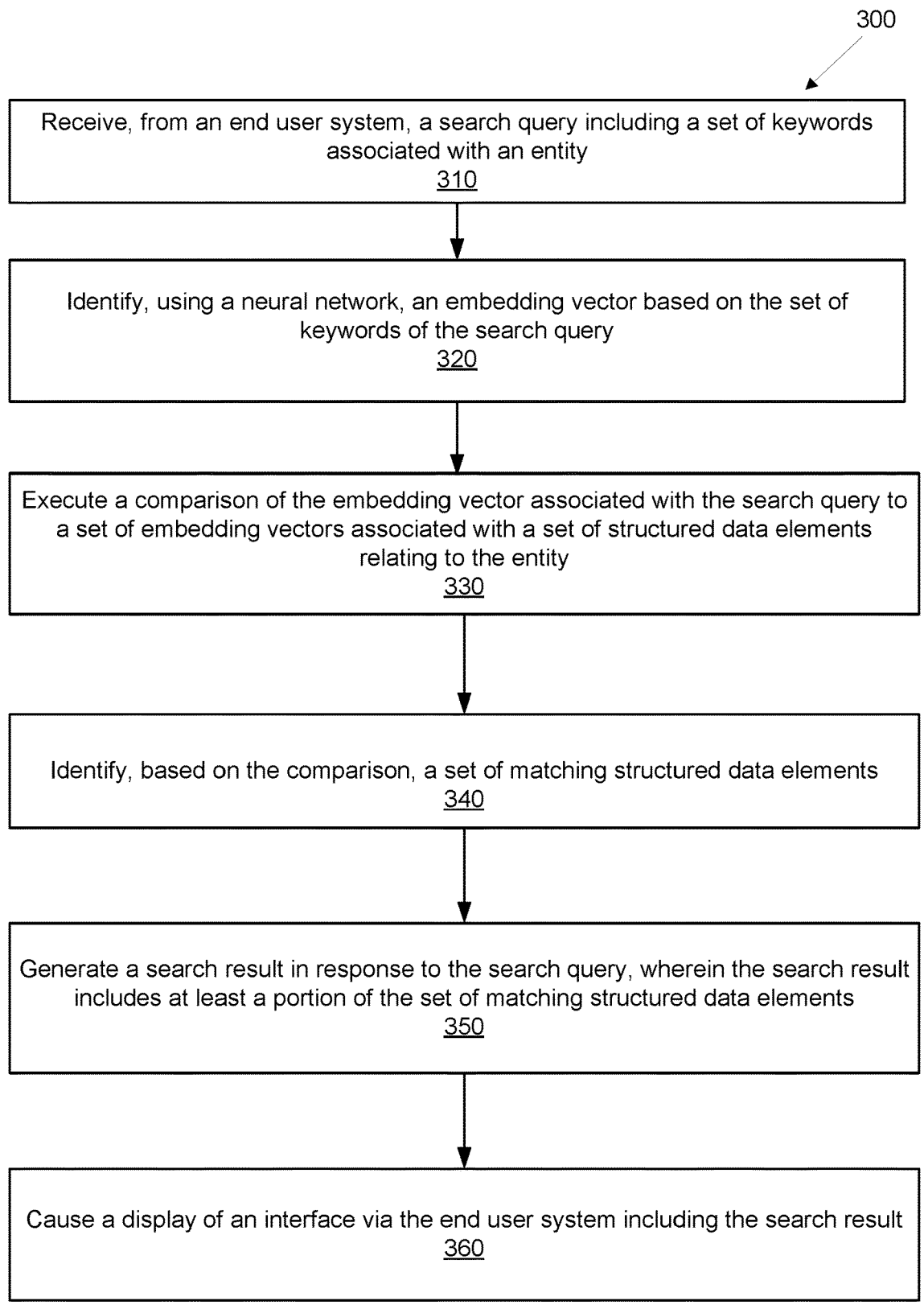
FIG. 3 illustrates a flow of an example method including generating and causing a display of search results in response to a search query based on comparisons of embedding vectors associated with a set of structured data elements and the search query, in accordance with one or more aspects of the disclosure.

In an embodiment, method 200 can be performed in an "offline" environment, wherein the indexed data store of structured data elements and embedding vectors can be built to enable generation of search results in response to a "real-time" search query. associated with the In an embodiment, the indexed set of structured data elements and vector information represents search result candidate for responding to subsequent search queries, as described in greater detail with reference to FIG. 3.

FIG. 3 illustrates a flow diagram relating to an example method 300 including operations performed by a knowledge search system (e.g., knowledge search system 110 of FIG. 1), according to embodiments of the present disclosure. It is understood that the flowchart of FIG. 3 provides an example of the many different types of functional arrangements that may be employed to implement the operation of the notification management component as described herein. Method 300 may be performed by a processing logic that may comprise hardware (e.g., circuitry, dedicated logic, programmable logic, microcode, etc.), software (e.g., instructions run on a processing device), or a combination thereof. In one embodiment, the knowledge search system executes the method 300 to generate search results in response to a search query in view of a vector-based comparison of structured data elements associated with an entity and the search query.

In operation 310, the processing logic receives, from an end user system, a search query including a set of keywords associated with an entity. In an embodiment, the search query includes the set of one or more keywords via a search interface or webpage associated with the entity.

In operation 320, the processing logic identifies, using a neural network, an embedding vector based on the set of keywords of the search query. In an embodiment, a request for an embedding vector representing the search query is sent to the neural network. In an embodiment, the neural network receiving and processing the request for the embedding vector information is the same neural network as used in method 200, described above. In an embodiment, the neural network generates and return the embedding vector corresponding to the search query.

In operation 330, the processing logic executes a comparison of the embedding vector associated with the search query to a set of embedding vectors associated with a set of structured data elements relating to the entity. In an embodiment, the set of embedding vectors associated with the set of structured data elements is generated and stored in an indexed data store, as described in method 200. In an embodiment, the comparison includes a matching determination based on a relative similarity in a numerical vector space between the respective embedding vectors of the set of structured data elements and the embedding vector associated with the search query.

In an embodiment, the indexed set of structured data elements (e.g., the knowledge graph associated with the entity) is queried to identify candidate structured data elements which are within a distance threshold in a feature space based on the comparison of the embedding vectors. In an embodiment, the comparison includes scoring each of the structured data elements based on a distance metric function (e.g., a cosine similarity function, an Euclidean distance function, a Manhattan distance function, a Jaccard Similarity function, etc.).

In operation 340, the processing logic identifies, based on the comparison, a set of matching structured data elements. In an embodiment, the processing logic applies a distance threshold to each of the generated distance metric function scores. In an embodiment, the set of matching structured data elements is identified as the structured data element that have a distance-comparison score that is less than the distance threshold level, wherein smaller distance results represent structured data elements that are determined to be more relevant in response to the search query. In an embodiment, the distance threshold is adjustable and can be changed or updated based on input received from a user of the entity system or based on analytics performed by the neural network in view of aggregated training data.

In an embodiment, as an alternative to applying the distance threshold to identify the matching structured data elements, the processing logic can employ a top-N approach, wherein an N number of structured data elements are identified as matching.

In operation 350, the processing logic generate a search result in response to the search query, wherein the search result includes at least a portion of the set of matching structured data elements. In an embodiment, the set of matching structured data elements (e.g., the elements having a distance in the numerical vector space that is less than the distance threshold) can be further ranked based on their relative distance scores. For example, a first matching structured data element having a lowest relative distance score (e.g., being the closest to the embedding vector of the search query in the numerical vector space) can have a highest ranking, a second matching structured data element having a second lowest relative distance score can have a second highest ranking, and so on. In an embodiment, at least a portion of the matching structured data elements can be selected for inclusion in the search result.

In operation 360, the processing logic causes a display of an interface via the end user system including the search result. In an embodiment, respective locations or positions within the interface can be determined for the constituent matching structured data elements of the search result. For example, a "top" or highest priority position in the interface can be assigned to the matching structured data element having a lowest relative distance score, a second highest priority position in the interface can be can be assigned to the matching structured data element having a second lowest relative distance score, and so on. In an embodiment, the search results can be presented in a ranked order or listing based on the distance scores identified in operation 340.

Conventional systems typically fail to effectively match a keyword-based search query to an appropriate and responsive FAQ due to a failure to account for a context associated with the search query. According to embodiments of the present disclosure, the knowledge search system is configured to efficiently identify search results including FAQs that are responsive to a keyword-based search query. In an embodiment, the knowledge search system builds and maintains indices of the FAQs (e.g., structured data elements in the form of frequently asked questions that can be returned as a search result) associated with a particular entity. In each generated entity-specific index, each FAQ is associated a "name" field and a generated embedding vector associated with the FAQ.

As described above, the indexed data store including the FAQs can be searched or queried using an embedding vector generated for a search query term. The knowledge search system conducts a nearest neighbor search using the embedding vectors to identify the one or more FAQs closest to the query term in vector space, and returning those that are less than the distance threshold (e.g., the FAQs that satisfy the condition are returned as candidates for the search results).

In an embodiment, the knowledge search system is configured to simulate vector search using historical or actual queries and the FAQs and rate the query/FAQ pairs that were returned by an un-trained neural network model. In this embodiment, the FAQs that were returned using the simulation (e.g., the set of FAQs that would have been returned using an untrained vector search) to generate training data to be used as the basis for collecting labeled data.

Figure 4:
FIG. 4 illustrates an example including labeling of search query and structured data element pairs, in accordance with one or more aspects of the disclosure

In an embodiment, the knowledge search system is configured to label the training data generated based on the simulations. In an embodiment, the knowledge search system assigns one of the following labels to each search query and FAQ pair: 1) an "answer" label; 2) a "relevant" label; or 3) a "not relevant" label. In an embodiment, the "answer" label indicates the FAQ represents highly relevant content as it relates to the search query. FIG. 4 illustrates an example data structure 400 including example search query-FAQ pairs that are assigned the "answer" or "high relevance" label due to the high level of relevancy and responsiveness of the FAQ to the search query, in accordance with embodiments of the present disclosure.

In an embodiment, the "relevant" label indicates the FAQ provides information on the same topic that the user is asking about but does not necessarily provide the exact information that the user is searching for based on the submitted search query. For example, FAQs having the "relevant" label are acceptable if returned as a search result to the query.

In an embodiment, the "not relevant" label indicates the FAQ fails to provide information on the same topic that the user is asking about and misinterprets the user's query. For example, FAQs having the "not relevant" label are considered unacceptable if returned as a search result to the query.

In an embodiment, using the generated labels, the knowledge search system executes a training phase associated with the neural network configured to generate the embedding vectors for the search queries and structured data elements (e.g., FAQs). In an embodiment, during the training phase, given two sentences, the neural network model classifies the two sentences into one of the following classifications: 1) entail, 2) contradict, or 3) neutral. In an embodiment, the two sentences are passed to a transformer model to generate fixed-sized sentence embeddings. The sentence embeddings are then passed to a softmax classifier to derive a final label (e.g., entail, contradict, or neutral). In an embodiment, this generates sentence embeddings that are useful also for other tasks like clustering or semantic textual similarity. In an embodiment, a distance similarity comparison (e.g., a cosine similarity) is used to further refine the neural network modeling of the embedding vectors.

Figure 5:
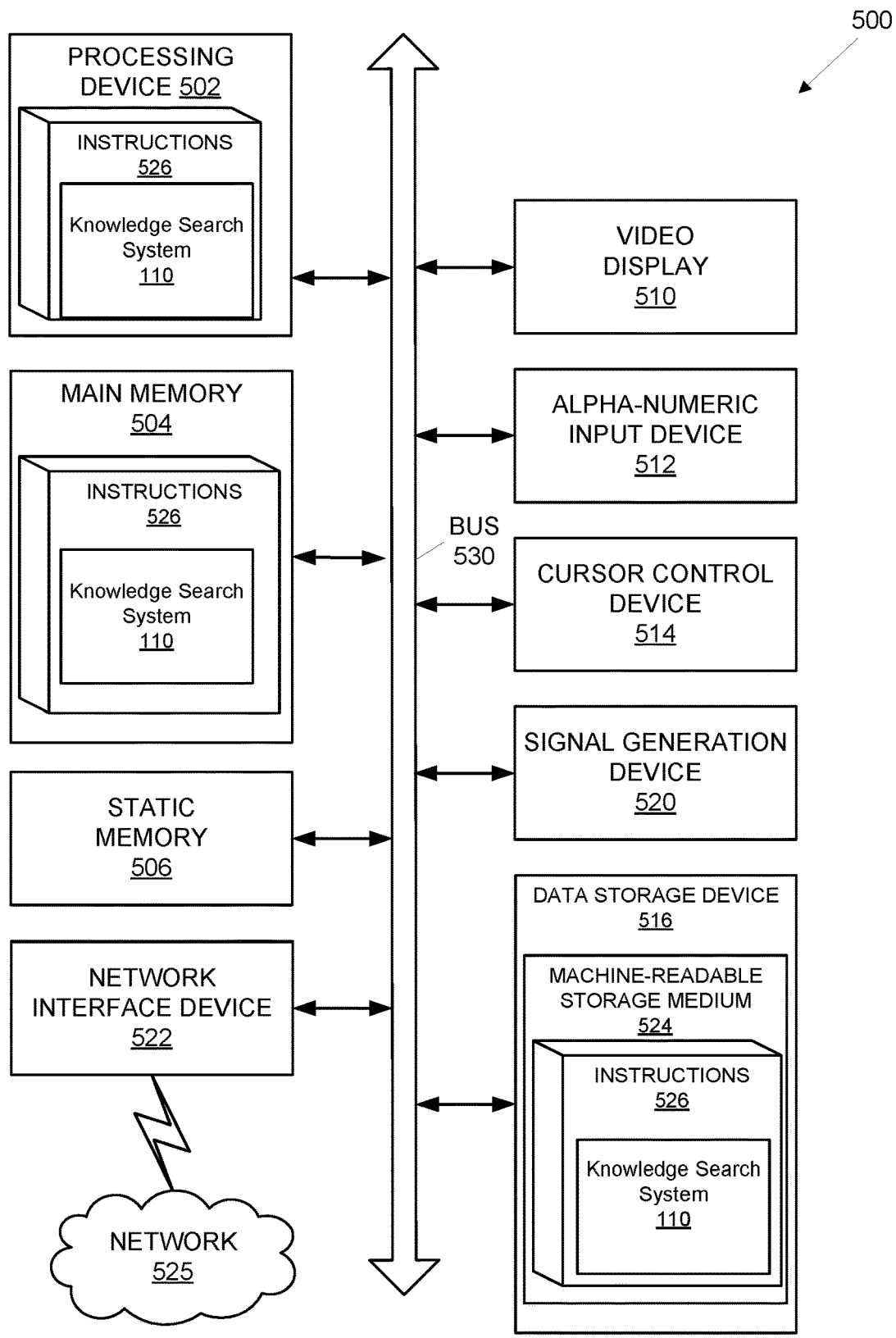
FIG. 5 illustrates an example computer system operating in accordance with some implementations.

FIG. 5 illustrates an example computer system 500 operating in accordance with some embodiments of the disclosure. In FIG. 5, a diagrammatic representation of a machine is shown in the exemplary form of the computer system 500 within which a set of instructions, for causing the machine to perform any one or more of the methodologies discussed herein, may be executed. In alternative embodiments, the machine 500 may be connected (e.g., networked) to other machines in a local area network (LAN), an intranet, an extranet, or the Internet. The machine 500 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 500. Further, while only a single machine is illustrated, the term "machine" shall also be taken to include any collection of machines that individually or jointly execute a set (or multiple sets) of instructions to perform any one or more of the methodologies discussed herein.

The example computer system 500 may comprise a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 516), which may communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute a search term management system for performing the operations and steps discussed herein. For example, the processing device 502 may be configured to execute instructions implementing the processes and methods described herein, for supporting a search term management system, in accordance with one or more aspects of the disclosure.

Example computer system 500 may further comprise a network interface device 522 that may be communicatively coupled to a network 525. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 520 (e.g., a speaker).

Data storage device 516 may include a computer-readable storage medium (or more specifically a non-transitory computer-readable storage medium) 524 on which is stored one or more sets of executable instructions 526. In accordance with one or more aspects of the disclosure, executable instructions 526 may comprise executable instructions encoding various functions of the knowledge search system 110 in accordance with one or more aspects of the disclosure.

Executable instructions 526 may also reside, completely or at least partially, within main memory 504 and/or within processing device 502 during execution thereof by example computer system 500, main memory 504 and processing device 502 also constituting computer-readable storage media. Executable instructions 526 may further be transmitted or received over a network via network interface device 522.

While computer-readable storage medium 524 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "routing," "identifying," "generating," "providing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   selecting, during a training phase associated with a neural network, from one or more search logs, a set of pairs, wherein each pair comprises:
   a query; and
   a previously answered frequently asked question associated with the query;
   generating, by the neural network executed by a processing device, a set of embedding vectors for each pair in the set of pairs, resulting in a plurality of embedding vectors for previous queries, wherein each set of embedding vectors comprises an embedding of the query and an embedding of the previously answered frequently asked question associated with the query;
   generating an entity-specific index, wherein the entity-specific index comprises a set of indices for the plurality of embedding vectors for previous queries;
   receiving, from an end user system, a search query associated with an entity associated with the entity-specific index;
   generating, by the neural network, at least one query embedding based on the search query;
   comparing, using the entity-specific index, the at least one query embedding to the plurality of embedding vectors for previous queries using a distance measurement, resulting in a ordered list of frequently asked questions corresponding to the search query based on the distance measurement between the at least one query embedding and the plurality of embedding vectors for previous queries; and
   generating a search result in response to the search query, wherein the search result comprises the frequently asked question within the ordered list having a smallest distance.

2. The method of claim 1, further comprising generating, based on the comparing, scores representing a level of matching between the the at least one query embedding and the plurality of embedding vectors for previous queries.

3. The method of claim 1, further comprising:
   causing a display of the search result via an interface of the end user system.

4. The method of claim 1, further comprising:
   causing a display of the search result comprises a ranked listing of the frequently asked questions based on the ordered list.

5. A system comprising:
   a memory to store instructions; and
   a processing device, operatively coupled to the memory, to execute the instructions to perform operations comprising:
   selecting, during a training phase associated with a neural network, from one or more search logs, a set of pairs, wherein each pair comprises:
   a query; and
   a previously answered frequently asked question associated with the query;
   generating, by the neural network executed by a processing device, a set of embedding vectors for each pair in the set of pairs, resulting in a plurality of embedding vectors for previous queries, wherein each set of embedding vectors comprises an embedding of the query and an embedding of the previously answered frequently asked question associated with the query;
   generating an entity-specific index, wherein the entity-specific index comprises a set of indices for the plurality of embedding vectors for previous queries;

receiving, from an end user system, a search query associated with an entity associated with the entity-specific index;

generating, by the neural network, at least one query embedding based on the search query;

comparing, using the entity-specific index, the at least one query embedding to the plurality of embedding vectors for previous queries using a distance measurement, resulting in a ordered list of frequently asked questions corresponding to the search query based on the distance measurement between the at least one query embedding and the plurality of embedding vectors for previous queries; and generating a search result in response to the search query, wherein the search result comprises the frequently asked question within the ordered list having a smallest distance.

6. The system of claim 5, the operations further comprising:

storing, in a data store, the entity-specific index.

7. The system of claim 5, the operations further comprising:

generating scores representing a level of matching between the the at least one query embedding and the plurality of embedding vectors for previous queries.

8. The system of claim 7, wherein the display of the search result comprises a ranked listing of the frequently asked questions based on the ordered list.

9. The system of claim 7, the operations further comprising:

identifying a first subset of the set of matching structured data elements having a corresponding score that is less than a threshold level; and removing the first subset from the search result.

10. A non-transitory computer readable storage medium comprising instructions that, when executed by a processing device, cause the processing device to perform operations comprising:

selecting, during a training phase associated with a neural network, from one or more search logs, a set of pairs, wherein each pair comprises:

a query; and a previously answered frequently asked question associated with the query;

generating, by the neural network executed by a processing device, a set of embedding vectors for each pair in the set of pairs, resulting in a plurality of embedding vectors for previous queries, wherein each set of embedding vectors comprises an embedding of the query and an embedding of the previously answered frequently asked question associated with the query;

generating an entity-specific index, wherein the entity-specific index comprises a set of indices for the plurality of embedding vectors for previous queries;

receiving, from an end user system, a search query associated with an entity associated with the entity-specific index;

generating, by the neural network, at least one query embedding based on the search query;

comparing, using the entity-specific index, the at least one query embedding to the plurality of embedding vectors for previous queries using a distance measurement, resulting in a ordered list of frequently asked questions corresponding to the search query based on the distance measurement between the at least one query embedding and the plurality of embedding vectors for previous queries; and generating a search result in response to the search query, wherein the search result comprises the frequently asked question within the ordered list having a smallest distance.

11. The non-transitory computer readable storage medium of claim 10, the operations further comprising generating, based on the comparing, scores representing a level of matching between the the at least one query embedding and the plurality of embedding vectors for previous queries.

12. The non-transitory computer readable storage medium of claim 11, wherein the search result comprises a ranked listing of the frequently asked questions based on the ordered list.

13. The non-transitory computer readable storage medium of claim 12, the operations further comprising:

identifying a first portion of the set of matching structured data elements having a corresponding score that is less than a threshold level; and removing the first portion from the search result.

* * * * *